United States Patent
Vasavada et al.

(10) Patent No.: US 8,700,519 B2
(45) Date of Patent: Apr. 15, 2014

(54) SYSTEM AND METHOD FOR CORRELATING A SELLER'S INSURANCE CLAIM WITH A BUYER'S COMPLAINT

(75) Inventors: Maulin Vasavada, San Jose, CA (US); Prakash Muppirala, San Jose, CA (US); Mohan Jayapal, Cupertino, CA (US); Sanjay Narang, Foster City, CA (US)

(73) Assignee: eBay Inc., San Jose, CA (US)

( * ) Notice: Subject to any disclaimer, the term of this patent is extended or adjusted under 35 U.S.C. 154(b) by 53 days.

(21) Appl. No.: 13/079,553

(22) Filed: Apr. 4, 2011

(65) Prior Publication Data
US 2012/0116821 A1    May 10, 2012

Related U.S. Application Data

(60) Provisional application No. 61/412,256, filed on Nov. 10, 2010.

(51) Int. Cl.
*G06Q 40/00* (2012.01)
(52) U.S. Cl.
USPC .............................................. 705/37; 705/35
(58) Field of Classification Search
USPC ....................................................... 705/37, 35
See application file for complete search history.

(56) References Cited

U.S. PATENT DOCUMENTS

| 7,587,353 | B2 * | 9/2009 | Melchior et al. | 705/37 |
|---|---|---|---|---|
| 7,877,278 | B1 * | 1/2011 | Leonardo et al. | 705/4 |
| 2001/0044729 | A1 * | 11/2001 | Pomerance | 705/1 |
| 2002/0099567 | A1 * | 7/2002 | Joao | 705/1 |
| 2011/0058048 | A1 * | 3/2011 | Elazar et al. | 348/207.1 |

OTHER PUBLICATIONS

Zaritsky, Howard M. "Recent Tax Developments: An Estate planning perspective"; Tax management Estates, Gifts and Trusts Journal; Jan./Feb. 2005.*
Gage, Nicholas; "The new Pirates They make millions without cutlasses or cannons"; The Globe and Mail; Dec. 10, 1979.*

* cited by examiner

*Primary Examiner* — Edward Chang
(74) *Attorney, Agent, or Firm* — Schwegman Lundberg & Woessner, P.A.

(57) ABSTRACT

A method and a system for maintaining a record of a shipping insurance elected by a seller eligible to purchase the shipping insurance for an item to be shipped to a buyer are described. A claim and complaint module receives a complaint from the buyer and a claim from the seller. A claim processing module processes the claim from the seller based on the corresponding complaint from the buyer.

24 Claims, 8 Drawing Sheets

SYSTEM AND METHOD FOR CORRELATING A SELLER'S INSURANCE CLAIM WITH A BUYER'S COMPLAINT

CROSS-REFERENCE TO RELATED APPLICATION

This application claims priority from U.S. Provisional Patent Application Ser. No. 61/412,256 filed Nov. 10, 2010, which is incorporated herein by reference in its entirety.

TECHNICAL FIELD

This application relates generally to the field of computer technology, and in a specific example embodiment, a method and system for an automated processing of an insurance claim.

BACKGROUND

Websites provide a number of publishing, listing, and price-setting mechanisms whereby a publisher (e.g., a seller) may list or publish information concerning items for sale. The process of creating a listing may be a time-consuming and tedious process. The seller may not have a good idea of what the selling price should be, how much to charge for shipping, or what should go in a description for their item.

Currently, the provision of shipping insurance for items transacted (e.g., by an ecommerce retailer or marketplace) presents a number of challenges. Particularly, in the event that a shipped item is received by a buyer in a damaged condition, or this shipment is lost, it may be difficult for the seller to recover the expense of the damage or a lost item. While the shipping carriers such as USPS (UNITED STATES POSTAL SERVICE), UPS (United Parcel Service), FedEx (Federal Express) do offer insurance, the seller typically needs to provide evidence of the damaged delivery or loss to the shipping carrier. This requires that the buyer needs to ship the damaged item back to the seller, as the shipping carrier will only deal with the party (i.e. the seller) that purchased the insurance policy. This presents a number of challenges to sellers. Other companies enable a seller to buy insurance. However, the claim process for the insurance provided by these services is complicated and challenging.

BRIEF DESCRIPTION OF THE DRAWINGS

The present invention is illustrated by way of example, and not by way of limitation, in the figures of the accompanying drawings in which.

DETAILED DESCRIPTION

Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

In various embodiments, a method and a system maintain a record of a shipping insurance elected by a seller eligible to purchase the shipping insurance for an item to be shipped to a buyer. A claim and complaint module receives a complaint from the buyer and a claim from the seller. A claim processing module processes the claim from the seller based on the complaint from the buyer.

Figure 1:
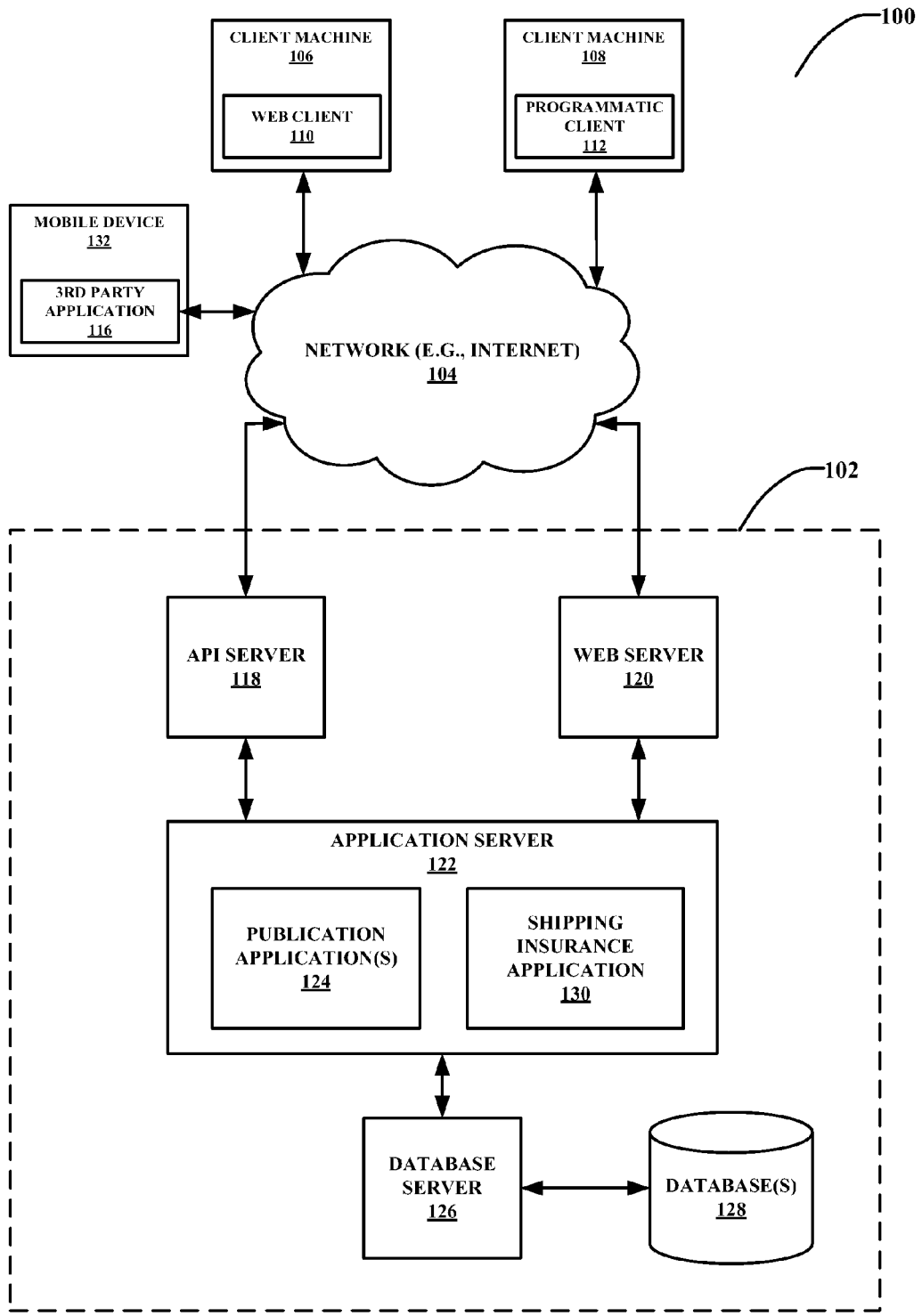
FIG. 1 is a network diagram depicting a network system, according to one embodiment, having a client-server architecture configured for exchanging data over a network.

FIG. 1 is a network diagram depicting a network system 100, according to one embodiment, having a client-server architecture configured for exchanging data over a network. For example, the network system 100 may be a publication/publisher system 102 where clients may communicate and exchange data within the network system 100. The data may pertain to various functions (e.g., online item purchases) and aspects (e.g., managing content and user reputation values) associated with the network system 100 and its users. Although illustrated herein as a client-server architecture as an example, other embodiments may include other network architectures, such as a peer-to-peer or distributed network environment.

A data exchange platform, in an example form of a network-based publisher 102, may provide server-side functionality, via a network 104 (e.g., the Internet) to one or more clients. The one or more clients may include users that utilize the network system 100 and more specifically, the network-based publisher 102, to exchange data over the network 104. These transactions may include transmitting, receiving (communicating) and processing data to, from, and regarding content and users of the network system 100. The data may include, but are not limited to, content and user data such as feedback data; user reputation values; user profiles; user attributes; product and service reviews and information, such as pricing and descriptive information; product, service, manufacture, and vendor recommendations and identifiers; product and service listings associated with buyers and sellers; auction bids; and transaction data, among other things.

In various embodiments, the data exchanges within the network system 100 may be dependent upon user-selected functions available through one or more client or user interfaces (UIs). The UIs may be associated with a client machine, such as a client machine 106 using a web client 110. The web client 110 may be in communication with the network-based publisher 102 via a web server 120. The UIs may also be associated with a client machine 108 using a programmatic client 112, such as a client application, or a mobile device 132 with a third party application 116. It can be appreciated in various embodiments the client machine 106, 108, or mobile device 132 may be associated with a buyer, a seller, a third party electronic commerce platform, a payment service provider, or a shipping service provider, each in communication with the network-based publisher 102 and optionally each other. The buyers and sellers may be any one of individuals, merchants, or service providers, among other things.

A mobile device 132 may also be in communication with the network-based publisher 102 via a web server 120. The mobile device 132 may include a portable electronic device providing at least some of the functionalities of the client machines 106 and 108. The mobile device 132 may include the third party application 116 (or a web client) configured communicate with application server 122.

Turning specifically to the network-based publisher 102, an application program interface (API) server 118 and a web server 120 are coupled to, and provide programmatic and web interfaces respectively to, one or more application servers 122. The application servers 122 host one or more publication application (s) 124 and a shipping insurance application 130. The application servers 122 are, in turn, shown to be coupled to one or more database server(s) 126 that facilitate access to one or more database(s) 128.

In one embodiment, the web server 120 and the API server 118 communicate and receive data pertaining to listings, transactions, and feedback, among other things, via various user input tools. For example, the web server 120 may send and receive data to and from a toolbar or webpage on a browser application (e.g., web client 110) operating on a client machine (e.g., client machine 106). The API server 118 may send and receive data to and from an application (e.g., client application 112 or third party application 116) running on another client machine (e.g., client machine 108 or mobile device 132).

In one embodiment, the network-based publisher 102 provides a multitude of feedback, reputation, aggregation, and listing and price-setting mechanisms whereby a user may be a seller or buyer who lists or buys goods and/or services (e.g., for sale) published on the network-based publisher 102.

The publication application 124 may provide a number of publisher functions and services (e.g., listing, payment, etc.) to users that access the network-based publisher 102. For example, the publication application(s) 124 may provide a number of services and functions to users for listing goods and/or services for sale, facilitating transactions, and reviewing and providing feedback about transactions and associated users.

The shipping insurance application 130 determines a seller's eligibility to participate in a shipping insurance program and automatically processes claims from sellers arising from the shipping insurance program. In one embodiment, the focus of the shipping insurance program is on purchased goods/items. Items shipped from a seller to a buyer are insured against loss (the buyer does not receive the shipped goods) and/or damages (the buyer receives the shipped goods but they are damaged). Embodiments of the shipping insurance application 130 are further described below.

Figure 2:
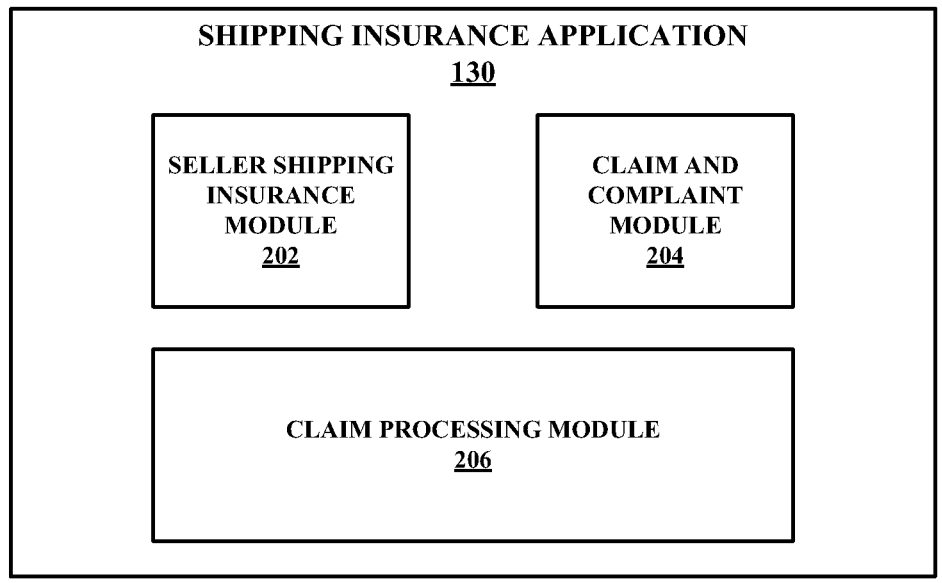
FIG. 2 is a block diagram illustrating an example embodiment of a shipping insurance application.

FIG. 2 is a block diagram illustrating an example embodiment of the shipping insurance application 130. The shipping insurance application 130 has a seller shipping insurance module 202, a claim and complaint module 204, and a claim processing module 206. The seller shipping insurance module 202 maintains a record of a shipping insurance elected by a seller eligible to purchase the shipping insurance for an item to be shipped to a buyer. The claim and complaint module 204 receives a complaint from the buyer for receiving the item damaged or not receiving the item, and a claim from the seller based on the shipping insurance. The claim processing module 206 processes claims from sellers based on corresponding complaints from buyers.

Figure 3:
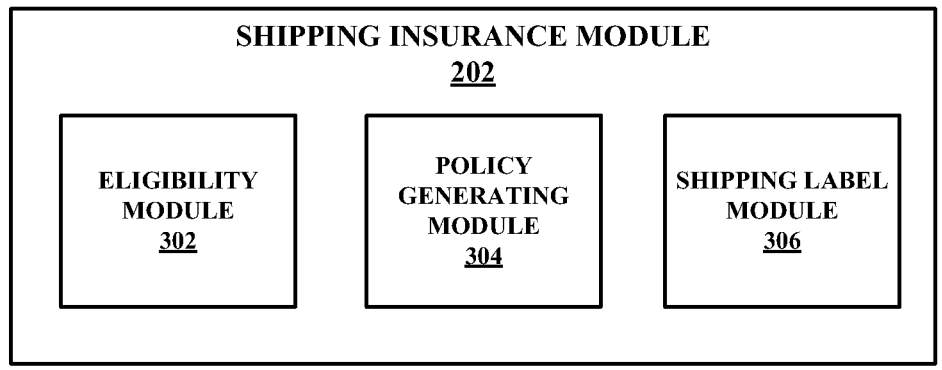
FIG. 3 is a block diagram illustrating an example embodiment of a shipping insurance module.

FIG. 3 is a block diagram illustrating an example embodiment of the shipping insurance module 202. In one embodiment, the shipping insurance module 202 has a seller shipping insurance eligibility module 302, a shipping label module 306, and a policy generating module 304.

The seller shipping insurance eligibility module 302 determines whether a seller is eligible to purchase the shipping insurance based on at least a record of the seller, a shipping-from address, and a shipping-to address. For example, sellers with poor selling records and/or negative feedbacks from buyers may not be eligible to participate in the shipping insurance program. In another example, a destination address (shipping-to) or an origin address (shipping-from) associated with an unusually high number of complaints from buyers or prior claims from sellers may prevent a seller from qualifying to participate in the shipping insurance program. Those of ordinary skills in the art will recognize that other factors (e.g. number of transactions from the seller/buyer, type of goods being shipped, value of the goods being shipped, and so forth . . . ) may be used to determine whether the seller is eligible to participate in the shipping insurance program. Once the seller is determined to be eligible, the seller shipping insurance eligibility module 302 may present the seller with an offer/option to purchase the shipping insurance program through an online marketplace prior to the seller shipping the goods to the buyer. The seller may choose then whether to participate in the shipping insurance program. In one embodiment, the insurance policy fee to participate in the shipping insurance program may be paid up front by the seller.

The pricing of the insurance, offered by the marketplace (e.g., acting as an agent) to the seller may be varied based on any one of a number of factors. Such factors may include whether the seller is a volume seller (power seller), or a reputation information of the seller (e.g., a calculated risk), and historical information associated with the seller.

The policy generating module 304 issues an insurance policy for the shipping insurance for an eligible seller who opts to purchase the shipping insurance. The insurance policy can be identified with a unique policy number for the transaction. In another embodiment, the policy number may be a unique identifier associated with the seller for all eligible insurance transactions from the seller. The insurance policy may be provided by the online marketplace and underwritten by a financial institution. In one embodiment, the insurance policy is generated based on the value of the shipped good. The seller may have the option to choose the coverage value of the shipping insurance.

The shipping label module 304 generates a shipping label that incorporates the shipping insurance policy information as generated by the policy module 304. For example, once the seller opts to participate in the shipping insurance program, the seller is offered to purchase a shipping label that includes a tracking number associated with the insurance policy number generated by policy module 304. In one embodiment, the shipping label module 304 offers the seller the choice of shipping rates (e.g. express, standard, value). The shipping label module 304 may obtain information (the name and address of the seller and the buyer, dimension of the package, weight of the package, and weight of item) from the publication application 124, the database server 126, and the database 128. In one embodiment, the shipping carrier includes the U.S. Postal Service.

Figure 4:
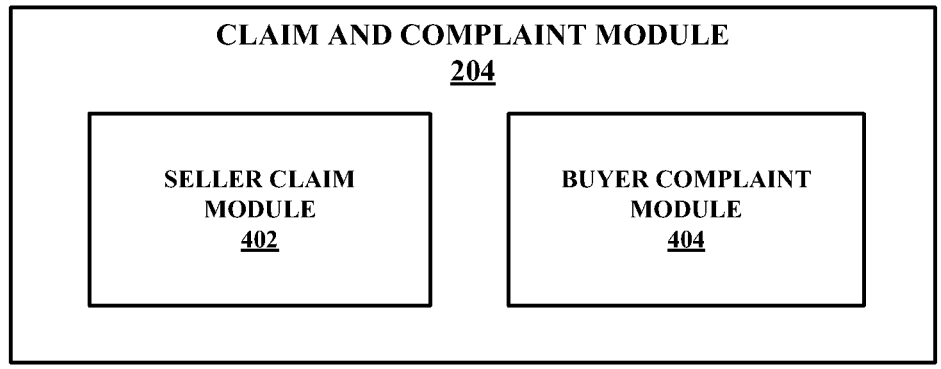
FIG. 4 is a block diagram illustrating an example embodiment of a claim and complaint module.

FIG. 4 is a block diagram illustrating an example embodiment of a claim and complaint module 204. In one embodiment, the claim and complaint module 204 includes a seller claim module 402 and a buyer complaint module 404.

The seller claim module 402 receives a claim from the seller related to the purchased the shipping insurance. In one embodiment, the claim includes information such as whether the item received by the buyer but was damaged or whether the package was lost, the tracking information, and the claim amount. For example, the seller may receive a communication from the buyer that the goods received were damaged during shipping. In another example, the seller receives a communication from the buyer that the buyer did not receive the package within a predetermined amount of time. Based on the communication from the buyer, the seller may file a claim using the seller claim module 402. In one embodiment, the seller claim module presents the seller with a web page comprising retrieved information from database 128 associated with the financial transaction between the seller and the buyer. The web page requests further information from the seller such as the reason for filing the claim and the claim amount. Once the claim is filed, the seller may receive a confirmation of the claim via email.

In another embodiment, the seller may file a claim only after a predetermined amount of time has elapsed from the time of shipping (e.g. 7 days for damaged item and 30 days for lost item) of the corresponding shipped goods. The seller claim module 402 may send an email to both the seller and the buyer to confirm the claim from the seller.

The buyer complaint module 404 receives the complaint from the buyer based on the item. In one embodiment, the complaint includes information such as whether the received item was damaged or whether the package was lost, and the tracking information. For example, the complaint may specify that the buyer did not receive the package within a predetermined amount of time. In one embodiment, the buyer may file a complaint after a predetermined amount of time has elapsed from the time of shipping (e.g. 30 days). The buyer complaint module 404 may send an email to both the seller and the buyer to confirm the complaint from the buyer.

Figure 5:
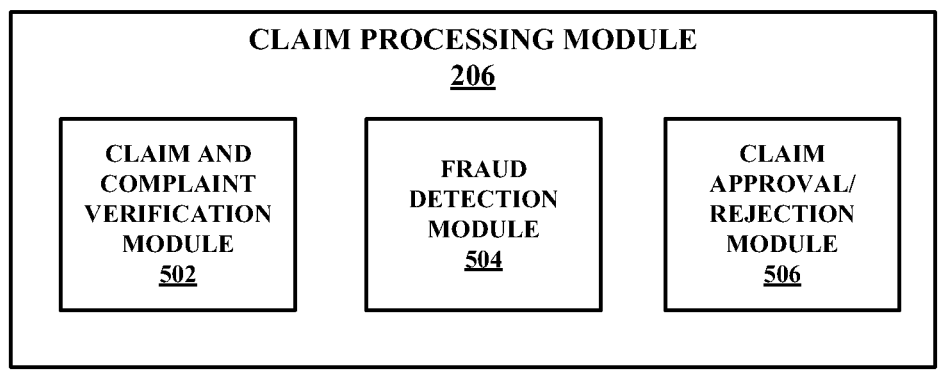
FIG. 5 is a block diagram illustrating an example embodiment of a claim processing module.

FIG. 5 is a block diagram illustrating an example embodiment of a claim processing module 206. The claim processing module 206 has a claim and complaint verification module 502, a fraud detection module 504, and a claim approval and rejection module 506.

The claim and complaint verification module 502 correlates the claim from the seller with the complaint from the buyer for the shipped item. In one embodiment, the claim and complaint verification module 502 determines whether a claim from a seller with respect to a purchased shipping insurance policy on a shipped item corresponds to a complaint from a buyer with respect to the same shipped item. The claim and complaint verification module 502 may compare and correlate a number of information (e.g., tracking number, transaction identifier, item identifier, seller and buyer identity, shipping insurance policy number, claim and complaint reasons and so forth) available from the seller claim module 402 and the buyer complaint module 404 to verify that the information correlates and matches before approving or denying the seller's claim. For example, a buyer's complaint may indicate that the item has not been received by the buyer. The seller's claim may indicate that the item has not been received by the buyer. Because both buyer's complaint and seller's claim are consistent with each other, the seller's claim is validated and is likely to be approved.

However, the claim and complaint verification module 502 can determine any inconsistency between the seller's claim and the buyer's claim. For example, the buyer's complaint may indicate that the item was received in a damaged condition while the seller's claim may indicate that the item was not received by the buyer. Because both buyer's complaint and seller's claim are inconsistent and do not validate each other, the seller's claim is not validated and is likely to be denied.

In one embodiment, the claim and complaint verification module 502 correlates the claim from the seller with the complaint from the buyer for the shipped item based on the buyer validating the claim from the seller and based on the seller validating the complaint from the buyer. For example, the seller may have submitted a claim with the seller claim module 402. If the claim and complaint verification module 502 does not find a corresponding complaint from the buyer, the claim and complaint verification module 502 contacts the buyer to verify the validity of the claim. In other words, the claim and complaint verification module 502 will determine whether the claim from the seller correlates with a reason provided by the buyer in response to contacting the buyer. Thus, the buyer may validate the claim from the seller by responding to the claim and complaint verification module 502 that the item was indeed not received or received in a damaged condition as indicated in the claim from the seller. In another embodiment, the buyer has a predetermined amount of time to validate the claim from the seller (e.g. 15 days). If the claim from the seller is not validated within the predetermined amount of time, the claim from the seller may be denied.

In another embodiment, the buyer may have not received the purchased item within a predetermined amount of time or has received the purchased item in a damaged condition, the buyer may then contact the seller directly without filing a complaint with the buyer complaint module 404. The seller then files a claim with the seller claim module 402. The claim and complaint verification module 502 then contacts the buyer to validate the claim from the seller.

In another embodiment, the claim and complaint verification module 502 automatically and without human-intervention files the claim based on the seller failing to lodge the claim within a predetermined period, via an electronic marketplace on which a transaction of the item occurred. For example, a buyer has submitted a complaint to buyer complaint module 404. Within a predetermined amount of time, if the seller fails to file a claim corresponding to the buyer's complaint, the claim and complaint verification module 502 automatically proceeds without human intervention and files a claim on behalf of the seller. In this scenario, proceeds of the pay out from the shipping insurance are kept by the electronic marketplace and compensated to the buyer through separate process.

The fraud detection module 504 determines a fraudulent activity from the buyer or the seller related to the shipped item. For example, a fraudulent activity may be determined when the claim from the seller is not validated by the buyer (e.g. the buyer claims that the item was received, the seller claims that the item was received in a damaged condition). Other fraudulent activity may be determined based on a transactional history of the seller and the buyer, the address of the buyer or seller, a credit card associated with other fraudulent activities, a credit card flagged from a financial institution, the number of claims filed by the seller, the number of complaints filed by the buyer, the value of the shipped item, and so forth. If the fraud detection module 504 suspects that there is a fraudulent activity, the fraud detection module 504 may pause the claim processing pending further investigation.

The claim approval and rejection module 506 approves or denies the claim from the seller based on results from the claim and complaint verification module 502 and the fraud detection module 504. Once the claim and complaint verification module 502 validates the seller's claim and the fraud detection module 504 determines that no fraudulent activities exist, the claim approval and rejection module 506 proceeds with approving the pay out or refund to the seller. If the claim and complaint verification module 502 does not validate the seller's claim or the fraud detection module 504 determines that fraudulent activities exist, the claim approval and rejection module 506 may deny the claim or payout to the seller.

Figure 6:
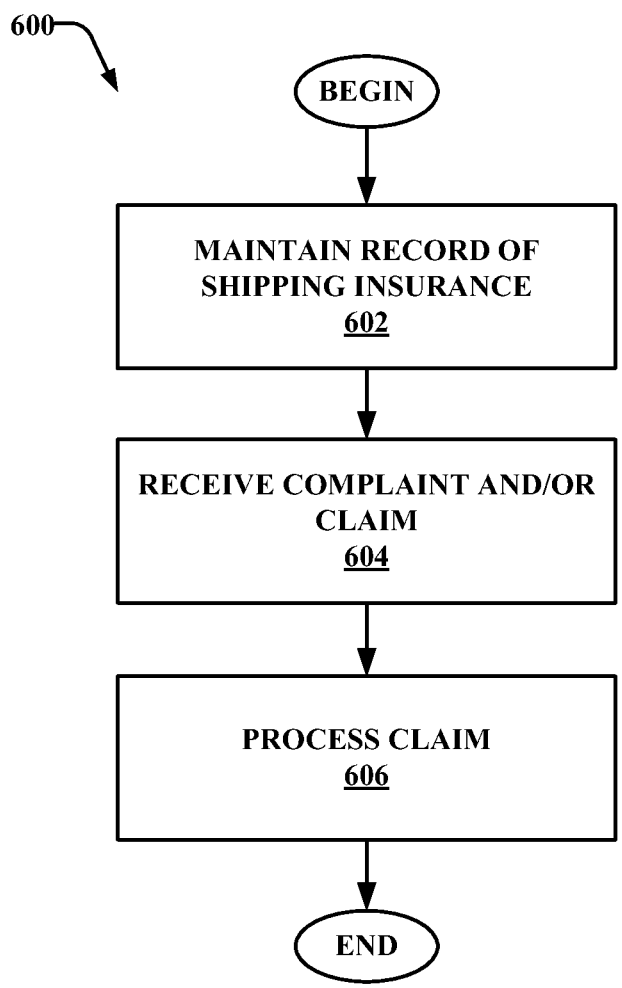
FIG. 6 is a flow chart of an example method for processing a shipping insurance claim.

FIG. 6 is a flow chart of one embodiment of a method for processing a shipping insurance claim. At 602, the seller shipping insurance module 202 maintains a record of a shipping insurance elected by a seller eligible to purchase the shipping insurance for an item to be shipped to a buyer. At 604, the claim and complaint module 204 receives a complaint from the buyer and/or a claim from the seller. At 606, the claim processing module 206 processes the claim from the seller based on the corresponding complaint or verification from the buyer.

Figure 7:
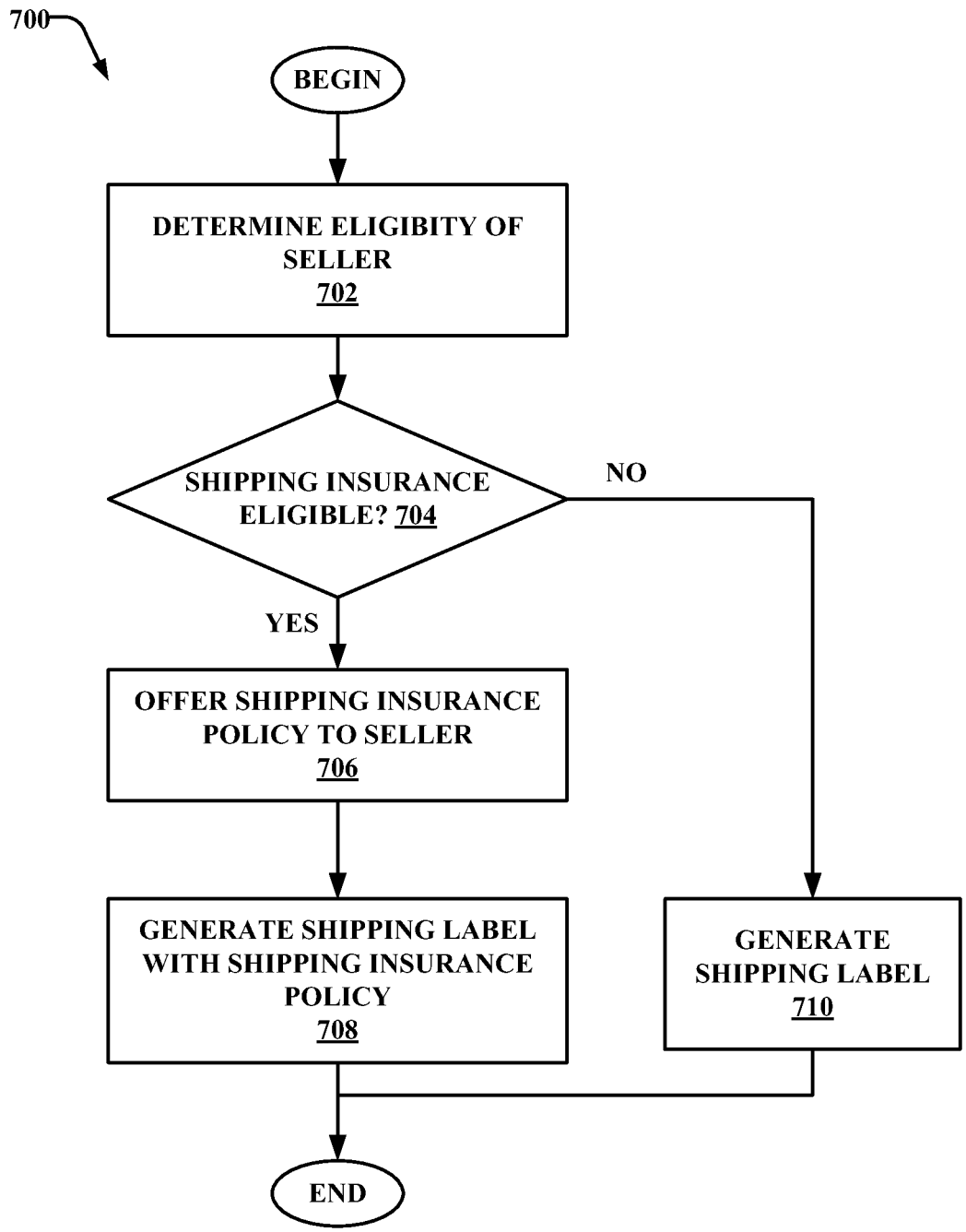
FIG. 7 is a flow chart of an example method for offering a shipping insurance policy to an eligible seller.

FIG. 7 is a flow chart of an example method for offering a shipping insurance policy to an eligible seller. At 702 and 704, the eligibility module 302 determines whether the seller is eligible to purchase the shipping insurance based on at least a record of the seller, shipping from address, and shipping to address. At 706, the shipping module 304 offers a shipping insurance policy to an eligible seller. If the seller decides to purchase the shipping insurance policy, the policy module 304 generates an insurance policy for the elected shipping insurance. At 708, the seller has the option to generate a shipping label that incorporates the elected shipping insurance. In the case where the seller is not eligible to purchase a shipping insurance, the seller is offered to generate a shipping label at 710.

Figure 8:
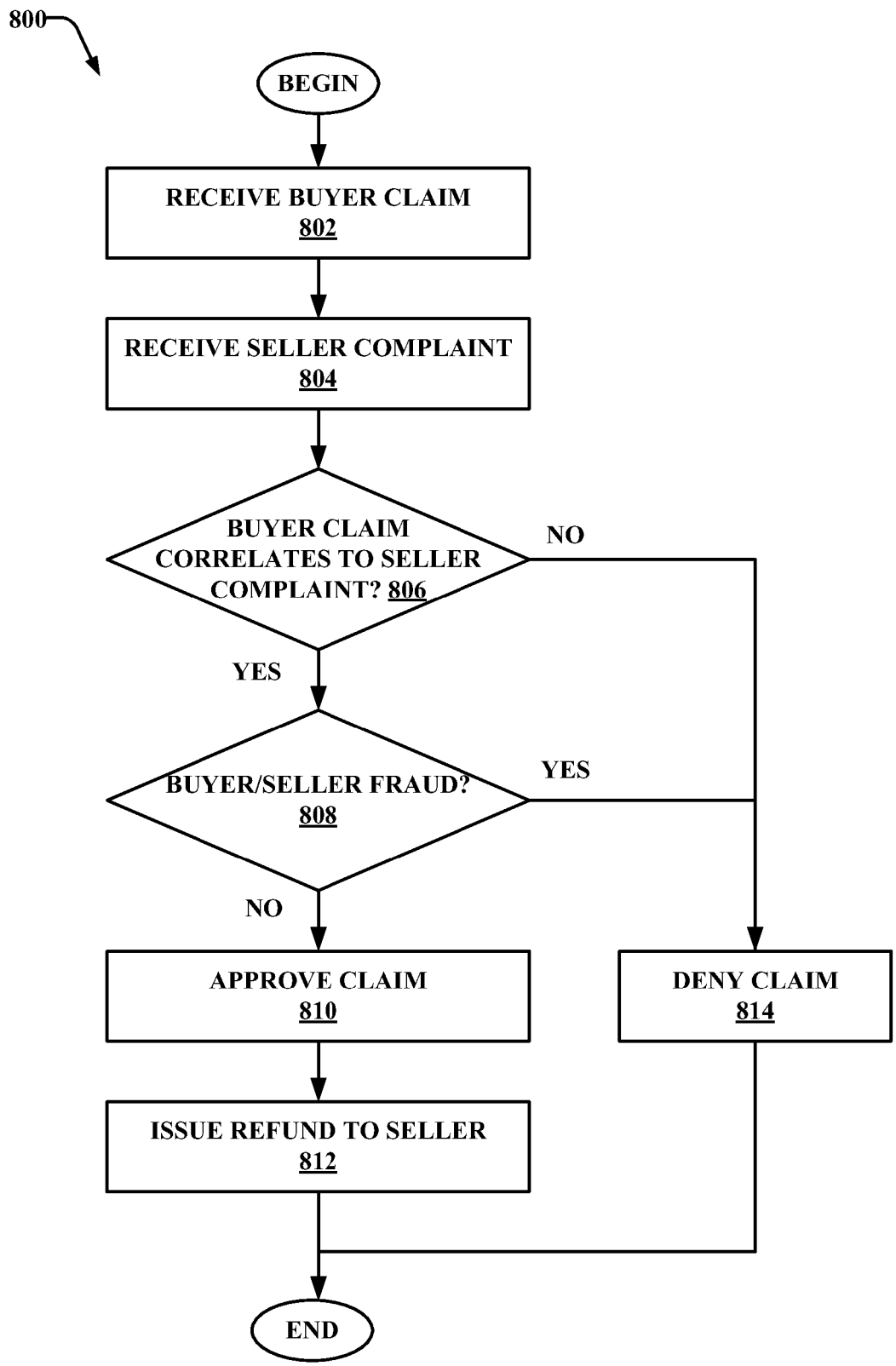
FIG. 8 is a flow chart of one embodiment of a method for processing an insurance claim.

FIG. 8 is a flow chart of one embodiment of a method for processing an insurance claim. At 802, the claim from the seller based on the shipping insurance is received. At 804, the complaint from the buyer based on the item is received. At 806, a determination is made as to whether the claim from the seller correlates with the complaint from the buyer for the shipped item. In one embodiment, the claim from the seller are correlated with the complaint from the buyer for the shipped item based on the buyer validating the claim from the seller and based on the seller validating the complaint from the buyer. In another embodiment, a claim is filed automatically and without human-intervention based on the seller failing to lodge the claim within a predetermined period, via an electronic marketplace on which a transaction of the item occurred.

At 810, fraudulent activities from the buyer or the seller related to the shipped item are determined. At 810, if the claim from the seller and the complaint from the buyer correlate with one another and fraud is not determined, the claim from the seller is approved at 810 and a refund is issued to the seller at 812. If the complaint from the buyer and the claim from the seller do not correlate to one another, or fraud is determined, the claim from the seller is denied at 814.

Figure 9:
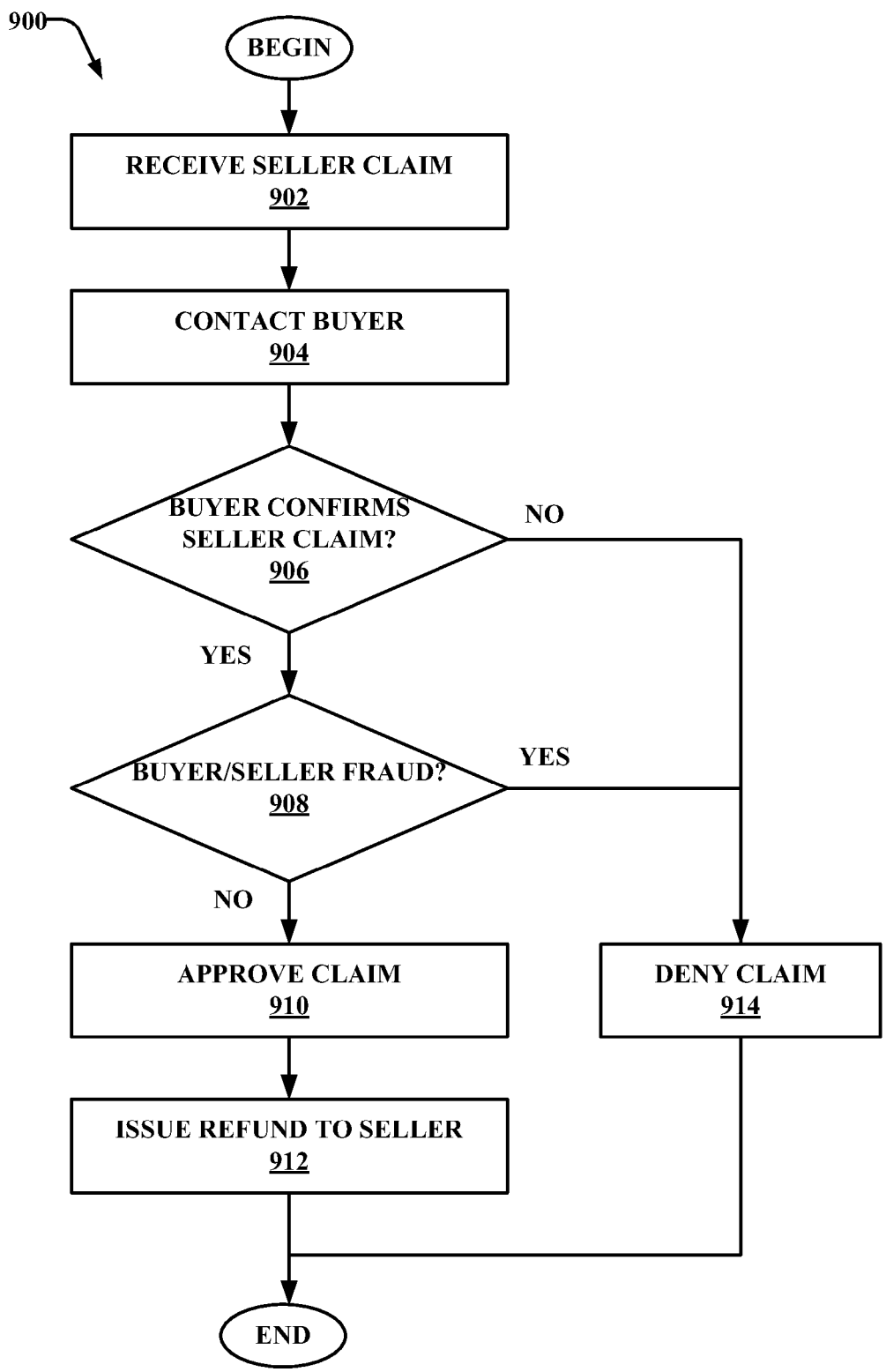
FIG. 9 is a flow chart of another embodiment of a method for processing an insurance claim.

FIG. 9 is a flow chart of another embodiment of a method for processing an insurance claim. At 902, the claim from the seller based on the shipping insurance is received. At 904, the buyer (who has not yet filed a complaint) is contacted. At 906, the buyer confirms whether the claim from the seller is valid.

At 908, fraudulent activities from the buyer or the seller related to the shipped item are determined. At 910, if the claim from the seller is validated by the buyer and fraud is not determined, the claim from the seller is approved at 910 and a refund is issued to the seller at 912. If the buyer does not validate the claim from the seller, or fraud is determined, the claim from the seller is denied at 914.

Figure 10:
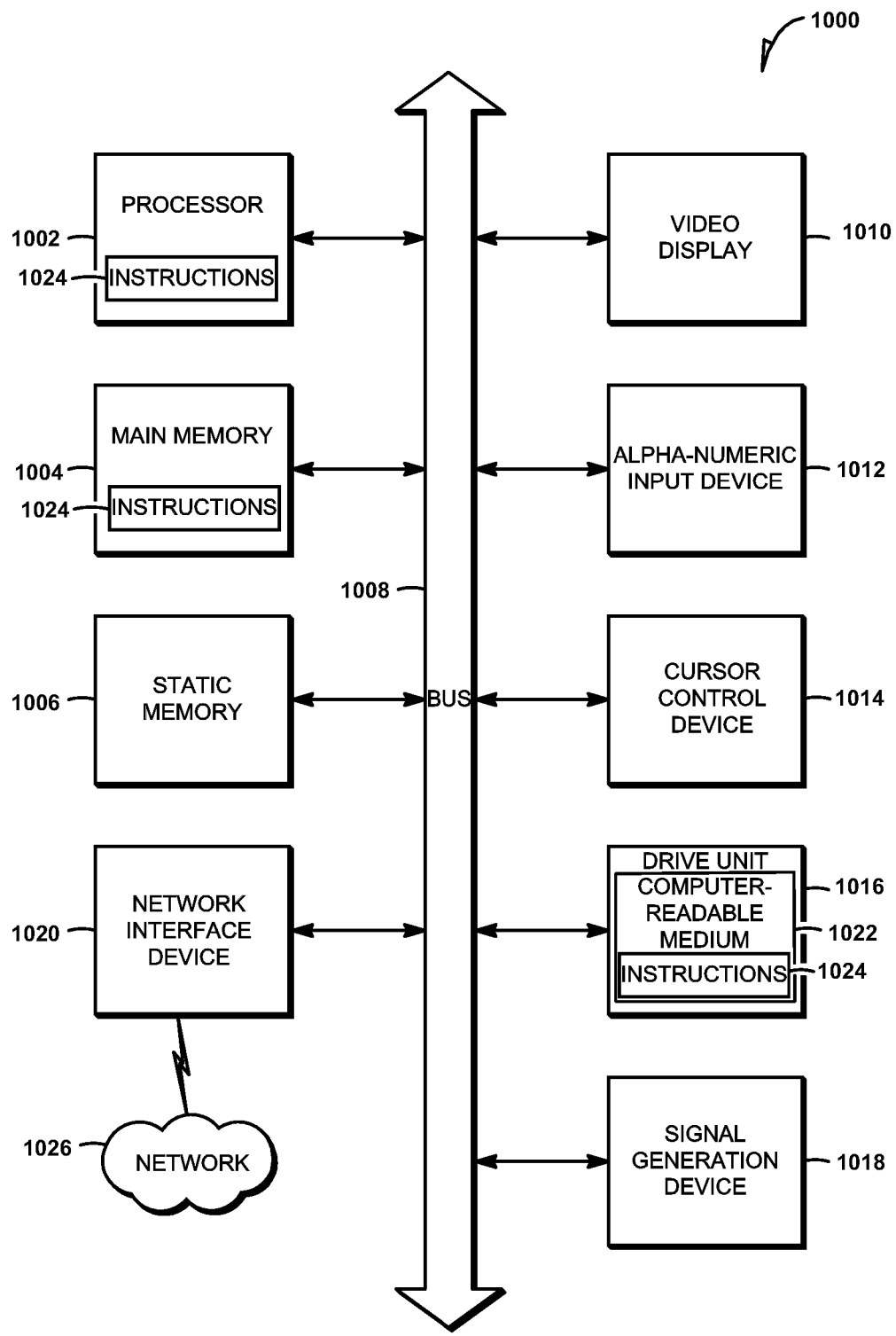
FIG. 10 shows a diagrammatic representation of machine in the example form of a computer system within which a set of instructions may be executed to cause the machine to perform any one or more of the methodologies discussed herein.

FIG. 10 shows a diagrammatic representation of machine in the example form of a computer system 1000 within which a set of instructions may be executed causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a graphics processing unit (GPU) or both), a main memory 1004 and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard), a user interface (UI) navigation device 1014 (e.g., a mouse), a disk drive unit 1016, a signal generation device 1018 (e.g., a speaker) and a network interface device 1020.

The disk drive unit 1016 includes a machine-readable medium 1022 on which is stored one or more sets of instructions and data structures (e.g., software 1024) embodying or utilized by any one or more of the methodologies or functions described herein. The software 1024 may also reside, completely or at least partially, within the main memory 1004 and/or within the processor 1002 during execution thereof by the computer system 1000, the main memory 1004 and the processor 1002 also constituting machine-readable media.

The software 1024 may further be transmitted or received over a network 1026 via the network interface device 1020 utilizing any one of a number of well-known transfer protocols (e.g., HTTP).

While the machine-readable medium 1022 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical media, and magnetic media.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system, comprising:
a processor; and
a memory comprising the following processor-executable modules:
a seller shipping insurance module configured to:
determine an eligibility of a seller to purchase a shipping insurance for an item to be shipped to a buyer, the eligibility to purchase the shipping insurance based on a reputation of the seller;
present the seller an option to purchase the shipping insurance through an electronic marketplace on which a transaction of the item occurred;
receive an election of shipping insurance from the seller;
issue an insurance policy for the shipping insurance;
maintain a record of the insurance policy; and
a claim and complaint module comprising a buyer complaint module configured to receive a complaint from the buyer for receiving the item damaged or not receiving the item.

2. The system of claim 1 wherein the seller shipping insurance module comprises:
a shipping label module configured to provide a shipping label that incorporates information identifying the shipping insurance.

3. The system of claim 1 wherein the claim and complaint module comprises:
a seller claim module configured to receive a claim from the seller based on the shipping insurance.

4. The system of claim 3 wherein the seller claim module is configured to contact the buyer to validate the claim from the seller, and wherein the buyer complaint module is configured to contact the seller to validate the complaint from the buyer.

5. The system of claim 3 comprising a claim processing module configured to:
process the claim from the seller based on the corresponding complaint from the buyer;
validate the claim from the seller based on a validation of the claim from the buyer;
validate the complaint from the buyer based on a validation of the complaint from the seller; and comprising
a claim and complaint verification module configured to correlate the claim from the seller with the complaint from the buyer for the shipped item;
a fraud detection module configured to determine a fraudulent activity from the buyer or the seller related to the shipped item; and
a claim approval and rejection module configured to approve or deny the claim from the seller based on results from the claim and complaint verification module and the fraud detection module.

6. The system of claim 5 wherein the claim and complaint verification module is configured to correlate the claim from the seller with the complaint from the buyer for the shipped item based on the buyer validating the claim from the seller and based on the seller validating the complaint from the buyer.

7. The system of claim 1 comprising a claim processing module configured to automatically and without human-intervention file a claim based on the seller failing to lodge the claim within a predetermined period, via the electronic marketplace on which the transaction of the item occurred.

8. A method comprising:
Determining by a processor, eligibility of a seller to purchase a shipping insurance for an item to be shipped to a buyer, the eligibility to purchase the shipping insurance based on a reputation of the seller;
Presenting the seller an option to purchase the shipping insurance through an electronic marketplace on which a transaction of the item occurred;
Receiving an election of shipping insurance from the seller;
Issuing an insurance policy for the shipping insurance;
Maintaining a record of the insurance policy; and
Receiving, at a processor-implemented claim and complaint module, a complaint from the buyer.

9. The method of claim 8 comprising:
providing a shipping label that incorporates information identifying the shipping insurance.

10. The method of claim 8 comprising:
receiving a claim from the seller based on the shipping insurance; and
receiving the complaint from the buyer based on the item.

11. The method of claim 10 comprising:
contacting the buyer to validate the claim from the seller; and
contacting the seller to validate the complaint from the buyer.

12. The method of claim 8 comprising:
determining a fraudulent activity from the buyer or the seller related to the shipped item.

13. The method of claim 12 comprising:
correlating the claim from the seller with the complaint from the buyer for the shipped item based on the buyer validating the claim from the seller and based on the seller validating the complaint from the buyer.

14. The method of claim 8 comprising:
filing a claim automatically and without human-intervention based on the seller failing to lodge the claim within a predetermined period, via an electronic marketplace on which a transaction of the item occurred.

15. A non-transitory computer-readable storage medium storing a set of instructions that, when executed by a processor, cause the processor to perform operations comprising:
determining an eligibility of a seller to purchase a shipping insurance for an item to be shipped to a buyer, the eligibility to purchase the shipping insurance based on a reputation of the seller;
presenting the seller an option to purchase the shipping, insurance through an electronic marketplace on which a transaction of the item occurred;
receiving an election of shipping insurance from the seller;
issuing an insurance policy for the shipping insurance;
maintaining a record of the insurance policy; and
receiving, at a processor-implemented claim and complaint module, a complaint from the buyer.

16. The non-transitory computer-readable storage medium of claim 15 comprising:
providing a shipping label that incorporates the shipping insurance.

17. The non-transitory computer-readable storage medium of claim 15 comprising:
receiving a claim from the seller based on the shipping, insurance; and
receiving the complaint from the buyer based on the item.

18. The non-transitory computer readable storage medium of claim 17 comprising:

contacting the buyer to validate the claim from the seller; and contacting the seller to validate the complaint from the buyer.

19. The non-transitory computer-readable storage medium of claim 17 comprising:

correlating the claim from the seller with the complaint from the buyer for the item;

determining, a fraudulent activity from the buyer or the seller related to the item; and validating the claim from the seller based on results from the correlating and the determining.

20. The non transitory computer-readable storage medium of claim 19 comprising:

correlating the claim from the seller with the complaint from the buyer for the item based on the buyer validating the claim from the seller and based on the seller validating the complaint from the buyer.

21. The non-transitory computer-readable storage medium of claim 15 comprising:

filing a claim automatically and without human-intervention based on the seller failing to lodge the claim within a predetermined period, via an electronic marketplace on which a transaction of the item occurred.

22. The non-transitory computer-readable storage medium of claim 15 wherein:

the determining whether the seller is eligible to purchase the shipping insurance determines based on a sales volume of the seller within the electronic marketplace.

23. The non-transitory computer-readable storage medium of claim 15 wherein:

the reputation of the seller is based on the number of complaints from buyers of items sold by the seller.

24. The non-transitory computer-readable storage medium of claim 15 wherein:

issuing an insurance policy for the shipping insurance includes setting a price for the shipping insurance based on a sales volume of the seller on the electronic marketplace.

* * * * *

UNITED STATES PATENT AND TRADEMARK OFFICE
CERTIFICATE OF CORRECTION

| | |
|---|---|
| PATENT NO. | : 8,700,519 B2 |
| APPLICATION NO. | : 13/079553 |
| DATED | : April 15, 2014 |
| INVENTOR(S) | : Vasavada et al. |

Page 1 of 1

It is certified that error appears in the above-identified patent and that said Letters Patent is hereby corrected as shown below:

In the Claims

Column 10, line 49, in Claim 15, delete "shipping," and insert --shipping--, therefor Column 10, line 63, in Claim 17, delete "shipping," and insert --shipping--, therefor Column 10, line 66, in Claim 18, delete "computer readable" and insert --computer-readable--, therefor Column 11, line 9, in Claim 19, delete "determining," and insert --determining--, therefor Column 11, line 13, in Claim 20, delete "non transitory" and insert --non-transitory--, therefor Signed and Sealed this
Second Day of December, 2014

Michelle K. Lee
*Deputy Director of the United States Patent and Trademark Office*